(12) United States Patent
Taylor, Jr.

(10) Patent No.: US 7,041,417 B2
(45) Date of Patent: May 9, 2006

(54) IMAGING PROCESS AND PRODUCTS PROVIDING DURABLE ASSEMBLAGES

(75) Inventor: Harvey Walter Taylor, Jr., Sayre, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/508,743

(22) PCT Filed: May 9, 2003

(86) PCT No.: PCT/US03/14784

§ 371 (c)(1), (2), (4) Date: Sep. 21, 2004

(87) PCT Pub. No.: WO03/098348

PCT Pub. Date: Nov. 27, 2003

(65) Prior Publication Data

US 2005/0164102 A1    Jul. 28, 2005

Related U.S. Application Data

(60) Provisional application No. 60/380,340, filed on May 13, 2002.

(51) Int. Cl.
- *G03F 7/34* (2006.01)
- *G03F 7/09* (2006.01)
- *G03C 8/26* (2006.01)
- *C08G 63/91* (2006.01)
- *C08L 67/00* (2006.01)

(52) U.S. Cl. ............... 430/7; 430/18; 430/20; 430/200; 430/201; 525/411; 525/415; 536/68

(58) Field of Classification Search ............... 430/7, 430/20, 200, 201, 18; 525/411, 415; 536/68
See application file for complete search history.

(56) References Cited

U.S. PATENT DOCUMENTS

| | | |
|---|---|---|
| 3,642,507 A | 2/1972 | Olhoft et al. |
| 3,781,381 A | 12/1973 | Koleska et al. |
| 4,529,788 A | 7/1985 | Asami et al. |
| 4,740,497 A | 4/1988 | Harrison et al. |
| 5,126,760 A | 6/1992 | DeBoer |
| 5,300,398 A | 4/1994 | Kaszczuk |
| 5,521,035 A | 5/1996 | Wolk et al. |
| 5,834,154 A | 11/1998 | Yamazaki et al. |
| 5,939,467 A | 8/1999 | Wnuk et al. |
| 6,294,308 B1 | 9/2001 | Caspar et al. |
| 6,316,385 B1 | 11/2001 | Usuki et al. |

FOREIGN PATENT DOCUMENTS

| | | |
|---|---|---|
| EP | 0 934 918 A | 8/1999 |
| WO | WO 97/34953 A | 9/1997 |

*Primary Examiner*—Richard L. Schilling
(74) *Attorney, Agent, or Firm*—Thomas H. Magee

(57) ABSTRACT

This invention relates to an image receiving layer (22) of a receiver element (20) for laser-induced thermal transfer imaging processes. The image receiving layer (22) is made from a formulation containing a caprolactone polymer and a cellulose ester. The invention is, typically, useful in proofing and color filter applications.

40 Claims, 2 Drawing Sheets

IMAGING PROCESS AND PRODUCTS PROVIDING DURABLE ASSEMBLAGES

CROSS-REFERENCE TO RELATED APPLICATIONS

This application claims the benefit of U.S. Provisional Application No. 60/380,340 filed on May 13, 2002 which is herein incorporated by reference in its entirety.

FIELD OF THE INVENTION

This invention relates to an image receiving layer of a receiver element for laser-induced thermal transfer processes.

BACKGROUND OF THE INVENTION

Laser-induced thermal transfer processes are well-known imaging processes used in applications such as color proofing, electronic circuit manufacture, color filters, lithography, and other areas. Such laser-induced processes include, for example, dye sublimation, dye transfer, melt transfer, and ablative material transfer. These processes have been described in, for example, Baldock, U.K. Patent 2,083,726; DeBoer, U.S. Pat. No. 4,942,141; Kellogg, U.S. Pat. No. 5,019,549; Evans, U.S. Pat. No. 4,948,776; Foley et al., U.S. Pat. No. 5,156,938; Ellis et al., U.S. Pat. No. 5,171,650; and Koshizuka et al., U.S. Pat. No. 4,643,917.

Laser-induced processes use a laserable assemblage comprising (a) a donor element that contains a donor layer comprising a material to be transferred (for example a colorant such as a dye, a pigment, or a pigmented layer), and (b) a receiver element having a receiving surface, that are in contact. The laserable assemblage is imagewise exposed by a laser, usually an infrared laser, resulting in a transfer of the material from the donor layer of the donor element to the receiver element, on or through its receiving surface. Each imagewise exposure takes place only in a small, selected region of the laserable assemblage at one time, so that the transfer of the material from the imageable element to the receiver element can be built up one pixel or region at a time. Computer control accomplishes the transfer with high resolution and at high speed. The laserable assemblage after the imagewise exposure to the laser as described supra, is henceforth termed an imaged laserable assemblage.

The imaged laserable assemblage can be separated into two elements, (c) a thermally imageable element containing material in unexposed regions, and (d) an imaged receiver element containing the transferred material from exposed regions. The imaged receiver element can be incorporated as above into a new laserable assemblage in order to imagewise transfer other material in a subsequent, often different, imagewise exposure. Such a repeated process can produce an imaged receiver element incorporating many different materials, which have been imagewise transferred using different assemblages. The different materials may each comprise a colorant, for example to produce a multicolor proof or a color filter. An imaged receiver element can by itself be regarded as a multi-element assemblage comprising a receiving layer and transferred materials, which can be useful as a color proof, color filter, or printing plate. However, in many cases an imaged receiver element is incorporated with other elements or materials by well known techniques to produce a final assemblage, e.g. a color proof, color filter, or printing element.

Laser induced thermal imaging processes and products, which utilize a receiver element, are described in U.S. Pat. No. 6,294,308 of Caspar, et al., U.S. Pat. No. 5,834,154, of Yamazaki et al., and U.S. Pat. No. 6,316,385 of Usuki, et al. Caprolactone polymers are used in receiver elements in U.S. Pat. No. 6,294,308.

U.S. Pat. No. 5,834,154, concerns a thermal transfer image-receiving sheet comprising a substrate sheet, a dye-receptive layer provided on at least one surface of the substrate sheet, and a backing layer provided on the other surface of the substrate sheet, wherein the dye-receptive layer contains polycaprolactone.

U.S. Pat. No. 6,316,385 discloses a thermal transfer dye image-receiving element that is said to form high-quality color images by a thermal transfer method. The disclosed thermal transfer dye image-receiving sheet comprises: a substrate sheet; and a dye-receptive layer provided on at least one side of the substrate sheet, the dye-receptive layer containing at least a modified polymer, namely a caprolactone-modified cellulose, the cellulose including a cellulose acetate component.

Compatibility of polymer blends is a highly complex field, and results are often difficult to predict. Performance characteristics in polymer blends, such as releasability, bleeding, durability, adhesivity, blocking, compatibility with adhesives, and clarity, clearness, or transparency, often must be empirically determined. However, polymer blends can be preferable over modified polymers because of availability, ease of variation to obtain desired properties, low price, or due to knowledge of desirable characteristics of each component in the polymer blend, such as low toxicity of the components of the polymer blend, in contrast to unknown or less well-known characteristics of a newer modified polymer.

It is important that the imaged receiver element be durable to the normal handling necessary to produce a final product, such as incorporation in multiple laserable assemblies, or lamination onto a permanent carrier.

It is desirable to use the imaged receiver element directly as, or incorporated into, a final product such as a color proof, color filter, or printing plate, in which the final outermost surface is exposed to the environment. It is important that the final outermost surface be durable and resistant to blocking during handling and use, for example if the final product is stacked and unstacked, held and released, or used in a printing process. In many cases it is useful for the final outer surface to be sufficiently transparent to allow viewing of, or the projection of light through, any colored materials which were imagewise transferred onto the receiver, for example to form a color proof or color filter.

SUMMARY OF THE INVENTION

The invention relates to a receiver element for receiving a thermally transferred image, comprising:
 a receiver support; and
 an image receiving layer applied to a surface of the receiver support for receiving a thermally transferred image, the image receiving layer comprising a caprolactone polymer composition comprising about 70% to about 100% by weight of caprolactone based on the entire weight of the caprolactone polymer composition and a cellulose ester composition comprising (a) about 20% to about 100% of a first ester group that is a propionyl group or a butyryl group or a combination of a propionyl and a butyryl group, (b) up to about 25% of a second ester group which is an acetyl group, and (c) up to about 10% of hydroxyl groups, based on the weight of the cellulose ester composition, the weight ratio of the caprolactone polymer composition to the cellulose ester composition being greater than about one to one.

The invention also relates to a formulation for forming an image receiving layer of a receiver element the formulation for receiving a thermally transferred image, comprising: a caprolactone polymer composition comprising about 70% to 100% by weight of caprolactone based on the entire weight of the caprolactone polymer composition and a cellulose ester composition comprising (a) about 20% to about 100% of a first ester group that is a propionyl group or a butyryl group or a combination of a propionyl and a butyryl group, (b) up to about 25% of a second ester group which is an acetyl group, and (c) up to about 10% of hydroxyl groups, based on the weight of the cellulose ester composition, the weight ratio of the caprolactone polymer composition to the cellulose ester composition being greater than about one to one.

The invention further relates to an assemblage comprising: a donor element comprising a donor layer which comprises a transfer material; and a receiver element comprising (a) a receiver support; and (b) a receiving layer applied to a surface of the receiver support for receiving the transfer material, the receiving layer comprising a caprolactone polymer composition comprising about 70% to 100% by weight of caprolactone based on the entire weight of the caprolactone polymer composition and a cellulose ester composition comprising (i) about 20% to about 100% of a first ester group that is a propionyl group or a butyryl group or a combination of a propionyl and a butyryl group, (ii) up to about 25% of a second ester group which is an acetyl group, and (iii) up to about 10% of hydroxyl groups, based on the weight of the cellulose ester composition, the weight ratio of the caprolactone polymer composition to the cellulose ester composition being greater than about one to one the receiving layer being adjacent to the donor layer.

Still further, the invention relates to a method for forming an imaged element, comprising: forming an assemblage, comprising: a donor element comprising a donor layer releaseably attached to a support, the donor layer comprising a transfer material, a receiver element comprising (a) a receiver support; and, (b) an image receiving layer applied to a surface of the receiver support for receiving the transfer material, the image receiving layer comprising a caprolactone polymer composition comprising about 70% to 100% by weight of caprolactone based on the entire weight of the caprolactone polymer composition and a cellulose ester composition comprising (i) about 20% to about 100% of a first ester group that is a propionyl group or a butyryl group or a combination of a propionyl and a butyryl group, (ii) up to about 25% of a second ester group which is an acetyl group, and (iii) up to about 10% of hydroxyl groups, based on the weight of the cellulose ester composition, the weight ratio of the caprolactone polymer composition to the cellulose ester composition being greater than about one to one wherein the donor layer is adjacent to the image receiving layer, and imagewise exposing the assemblage to actinic radiation sufficient to transfer the transfer material to the image receiving layer to form an imaged receiver.

Furthermore, the invention relates to a method of making a color filter comprising detaching the support of the donor element from the imagewise exposed assemblage to reveal an imaged surface of the imaged receiver and attaching the imaged receiver to a transparent substrate and then associating the imaged surface with an electrically conducting layer.

DETAILED DESCRIPTION OF THE INVENTION

Figure 1:
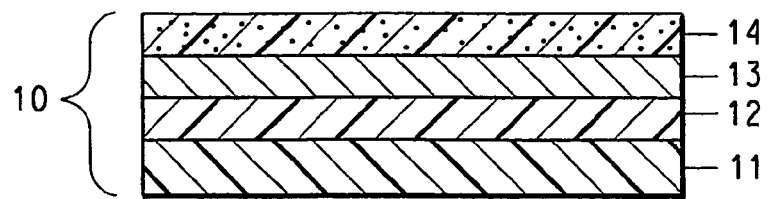
FIG. 1 illustrates a donor element (10) useful in the invention having a donor element support (11); a base element having a coatable surface comprising an ejection layer (12), a heating layer (13); and a donor layer (14).

Processes and products for laser induced thermal transfer imaging are disclosed wherein a receiver element provides an imaged receiver element and intermediate or final products having durability to handling and resistance to blocking which incorporate elements of the imaged receiver element. The receiver element can be used advantageously in a wide variety of applications using laser induced thermal imaging processes.

The invention relates to the formulation of an image receiving layer. The image receiving layer is made from a formulation comprising at least two compositions. The image receiving layer has been found to be durable and resistant to blocking. The formulation comprises (1) a caprolactone polymer composition and (2) a cellulose ester composition, preferably with the weight ratio of the caprolactone polymer composition to the cellulose ester composition greater than one to one.

The caprolactone polymer composition is a composition of one or more oligomers, polymers, copolymers, or structured polymers, wherein more than about 70% by weight of the caprolactone polymer composition is derived from the monomer unit caprolactone (also known as 6-hexanolactone, 2-oxepanone, having CAS # [502-44-3]). More preferably from about 70 to 100%, specifically about 90 to 100%, of the caprolactone polymer composition is derived from the monomer unit caprolactone, based on the weight of the caprolactone polymer composition. A preferred caprolactone polymer composition is TONE® P-787 homopolymer (CAS # [24980-41-4], Union Carbide, Danbury, Conn.).

The cellulose ester composition is derived from cellulose. Cellulose contains about 30% by weight of hydroxyl groups, and in the cellulose ester composition of this invention some of those hydroxyl groups have been converted to esters. The content of esters and the remaining hydroxyl content of the cellulose ester composition are determined by the methods of ASTM D817-96. Typically the esters comprise acetyl, propionyl, and butyryl groups. In a specific cellulose ester composition of this invention, the content of the combination of all propionyl and butyryl groups comprises at least about 20%, the content of all acetyl groups comprises at most about 25%, and the content of all hydroxyl groups comprises at most about 10%, by weight of the cellulose ester composition, as determined by the methods of ASTM D817-96.

It is preferred that the cellulose ester composition contains more than about 25%, up to about 100% by weight of esters which are esters of propionyl or butyryl groups or combination thereof. It is preferred that the cellulose ester composition contains less than about 10% to about 0% by weight of acetyl ester groups. It is preferred that the cellulose ester composition contains less than about 5% by weight of hydroxyl groups, more preferably less than about 3%, even more preferable about 0%.

Table 1 shows some preferred cellulose ester compositions available from Eastman Chemical Company, Kingsport, Tenn., named as cellulose acetate butyrates (CAB, CAS # [9004-36-8]) and cellulose acetate propionates (CAP, CAS # [9004-39-1]). Cellulose ester combinations useful in this invention can have melting ranges from about 120 to about 220 degrees centigrade, glass transition temperatures of about 90 to about 150 degrees centigrade, and molecular weights from about 5,000 to about 150,000 daltons.

for both polymers is tetrahydrofuran. A blend of solvents may also be useful. In a solvent blend a first solvent is suitable for the caprolactone and a second solvent is suitable for cellulose ester. An example of a suitable blend is a 50:50 blend of methyl ethyl ketone and acetone at 10% solids level.

When the formulation of this invention is used as a receiving layer in an image receiving element of a laserable assemblage, numerous benefits are obtained. Most notably the receiving surface has low tack and preferably is non-tacky, is resistant to blocking and preferably non-blocking, and has good durability which results in easy handling and use characteristics. The receiving layer releases well from selected supports, as well as having good retention of materials transferred from the donor element, such as pigmented layers. The receiving layer is of good visual clarity and resists scuffing and marring which can detract from clarity, while still giving good adhesion and retention of the transferred material which is heretofore associated with a tacky, deformable, easily marred, or soft adhesive material. The receiving layer was also found to retain an embossed pattern.

A specific use of this blend is in an image receiving element. Its process of use can be understood by reference to the drawings.

As shown in FIG. 1, an exemplary donor element useful for thermal imaging in accordance with the processes of this invention comprises a donor layer (14), which can be a pigmented layer, and a base element having a coatable surface which comprises an optional ejection layer (12) and a heating layer (13). Each of these layers has separate and distinct functions. Optionally, a donor element support (11) may also be present. In one embodiment, the heating layer (13) may be present directly on the donor element support (11).

One preferred base element comprises an ejection layer (12) or subbing layer (12), optionally on a donor element support (11), and a heating layer (13).

TABLE 1

| Name | Visc. (Poise) | Acetyl[C] % | Butyryl/ Propionyl % | Hydroxyl % | Melting Range ° C. | $T_g$ ° C. | $MW_n$ (,000) |
|---|---|---|---|---|---|---|---|
| CAB 551-0.2 | 0.76 | 2.0 | 52.0 | 1.8 | 130–140 | 101 | 30 |
| CAB 553-0.4 | 1.14 | 2.0 | 46.0 | 4.8 | 150–160 | 136 | 20 |
| CAB 531-1 | 7.22 | 3.0 | 50.0 | 1.7 | 135–150 | 115 | 40 |
| CAB 500-5 | 19.00 | 4.0 | 51.0 | 1.0 | 165–175 | 96 | 57 |
| CAB 381-20 | 76.00 | 13.5 | 37.0 | 1.8 | 195–205 | 141 | 70 |
| CAB 321-0.1 | 0.38 | 17.5 | 32.5 | 1.3 | 165–175 | 127 | 12 |
| CAP 482-0.5 | 1.52 | 2.5 | 45.0 | 2.6 | 188–210 | 142 | 25 |
| CAP 381-2 | 7.6 | 13.0 | 37.0 | 1.5 | 171–184 | 133 | 40 |

Typically the formulation of the image receiving layer is made by blending the at least two compositions. Preferably the formulation comprises about 55 to about 90 parts of the caprolactone polymer composition to about 45 to about 10 parts of the cellulose ester composition (so that the total parts by weight of the two compositions arbitrarily sum to 100, regardless of what proportion they comprise), most preferably about 70 parts of the caprolactone polymer composition to about 30 parts of the cellulose ester composition is used. A solvent for the formulation may also be used typically an organic polar solvent which is capable of dissolving both polymers. An example of a suitable solvent The donor element support may be a film. Preferably, the donor element support is thermoplastic film which can be a polyester film such as a thick (400 gauge) coextruded polyethylene terephthalate film. Alternately, the donor element support may be treated polyester, specifically polyethylene terephthalate that has been plasma treated to accept the heating layer. When the donor element support is plasma treated, a subbing layer or ejection layer is usually not provided on the donor element support. Backing layers may optionally be provided on the donor element support. These backing layers may contain fillers to provide a roughened surface on the back side of the donor element support.

Alternately, the donor element support itself may contain fillers, such as silica, to provide a roughened surface on the back surface of the donor element support.

The ejection layer (12), as shown in FIG. 1, is the layer that provides the force to effect transfer of the donor layer to the receiver element in the exposed areas. Preferably the ejection layer is flexible. When heated, this layer decomposes into gaseous molecules providing the necessary pressure to propel or eject the exposed areas of the donor layer onto the receiver element. This can be accomplished by using a polymer having a relatively low decomposition temperature (less than about 350° C., preferably less than about 325° C., and more preferably less than about 280° C.). In the case of polymers having more than one decomposition temperature, the first decomposition temperature should be lower than 350° C. Furthermore, in order for the ejection layer to have suitably high flexibility and conformability, it should have a tensile modulus that is less than or equal to 2.5 Gigapascals (GPa), preferably less than 1.5 GPa, and more preferably less than 1 Gigapascal (GPa). The polymer chosen should also be one that is dimensionally stable. If the laserable assemblage is imaged through the donor element flexible ejection layer, the flexible ejection layer should be capable of transmitting the laser radiation, and not be adversely affected by this radiation.

Examples of suitable polymers comprising the ejection layer include (a) polycarbonates having low decomposition temperatures (Td), such as polypropylene carbonate; (b) substituted styrene polymers having low decomposition temperatures, such as poly(alpha-methylstyrene); (c) polyacrylate and polymethacrylate esters, such as poly(methyl methacrylate) and poly(butyl methacrylate); (d) cellulosic materials having low decomposition temperatures (Td), such as cellulose acetate butyrate and nitrocellulose; and (e) other polymers such as polyvinyl chloride; poly(chlorovinyl chloride) polyacetals; polyvinylidene chloride; polyurethanes with low Td; polyesters; polyorthoesters; polyacrylonitrile and substituted acrylonitrile polymers; maleic acid resins; and copolymers of the above. Mixtures of the foregoing polymers can also be used. Additional examples of polymers having low decomposition temperatures can be found in U.S. Pat. No. 5,156,938. These include polymers that undergo acid-catalyzed decomposition. For these polymers, it is frequently desirable to include one or more hydrogen donors with the polymer.

Preferred polymers for the ejection layer are polyacrylate and polymethacrylate esters, low Td polycarbonates, nitrocellulose, poly(vinyl chloride) (PVC), and chlorinated poly(vinyl chloride) (CPVC). Most preferred are poly(vinyl chloride) and chlorinated poly(vinyl chloride).

Other materials can be present as additives in the ejection layer as long as they do not interfere with the essential function of the layer. Examples of such additives include coating aids, flow additives, slip agents, antihalation agents, plasticizers, antistatic agents, surfactants, and others which are known to be used in the formulation of coatings.

Alternately, an optional subbing layer (12) may be provided in place of the optional ejection layer resulting in a donor element having in order at (east one subbing layer (12), at least one heating layer (13), and at least one donor layer (14). The function of the subbing layer is to change the adhesion between the donor support (11) and the heating layer (13), typically to improve the integrity of the donor element (10). Some suitable materials for the subbing layer include polyurethanes, polyvinyl chloride, cellulosic materials, acrylate or methacrylate homopolymers and copolymers, and mixtures thereof. Other custom made decomposable polymers may also be useful in the subbing layer. Preferably useful as subbing layers for polyester, specifically polyethylene terephthalate, are acrylic subbing layers. Preferably, the subbing layer has a thickness of 100 to 1000 A.

The heating layer (13), as shown in FIG. 1, is deposited on the ejection or subbing layer. The function of the heating layer is to absorb the laser radiation and convert the radiation into heat. Materials suitable for the heating layer can be inorganic or organic and can inherently absorb the laser radiation or include additional laser-radiation absorbing compounds.

Examples of suitable inorganic materials are transition metal elements and metallic elements of Groups IIIA, IVA, VA, VIA, VIII, IIIB, and VB, their alloys with each other, their oxides, and their alloys with the elements of Groups IA and IIA of the Periodic Table of the Elements, Sargent Welch Scientific Company, 1979. Tungsten (W) is an example of a Group VIA metal that is suitable and which can be utilized. Carbon (a Group IVB nonmetallic element) can also be used. Preferred metals include Al, Cr, Sb, Ti, Bi, Zr, TiO2, Ni, In, Zn, and their alloys; carbon is a preferred nonmetal. More preferred metals and nonmetals include Al, Ni, Cr, Zr and C. Most preferred metals are Al, Ni, Cr, and Zr.

The thickness of the heating layer is generally about 20 Angstroms to 0.1 micrometer, preferably about 40 to 100 Angstroms.

Although it is preferred to have a single heating layer, it is also possible to have more than one heating layer, and the different layers can have the same or different compositions, as long as they all function as described above. The total thickness of all the heating layers should be in the range given above, i.e., 20 Angstroms to 0.1 micrometer.

The heating layer(s) can be applied using any of the well-known techniques for providing thin metal layers, such as sputtering, chemical vapor deposition, and electron beam.

The donor layer (14) comprises the transfer material. Applying a transfer material to a base element can form the donor layer. In such a case, the donor layer can comprise (i) a polymeric binder composition (which is different from the polymer in the optional ejection layer), and (ii) a colorant such as a pigment.

The polymeric binder composition should be film forming and can be coatable from a solution or from a dispersion. Polymeric binder compositions having melting points less than about 250° C. or plasticized to such an extent that the glass transition temperature is <70° C. are preferred. Heat fusible binders, such as waxes are useful as cobinders in decreasing the melting point of the donor layer.

It is preferred that the polymeric binder composition does not self-oxidize, decompose or degrade at the temperature achieved during the laser exposure so that the exposed areas of the donor layer comprising a polymeric binder composition and colorant, are transferred intact for improved durability. Suitable polymeric binders can comprise a styrene copolymer such as a copolymer of styrene and (meth) acrylate ester, such as styrene/methyl-methacrylate; copolymer of styrene and one or more olefin monomers, such as styrenelethylene/butylene; copolymers of styrene and acrylonitrile; other useful polymers include fluoropolymers; copolymers of (meth)acrylate esters with ethylene and carbon monoxide; polycarbonates; (meth)acrylate homopolymers and copolymers; polysulfones; polyurethanes; polyesters, or combinations thereof. The monomers for the above polymers can be substituted or unsubstituted. Mixtures of the foregoing polymers can be used.

Preferred polymers for the donor layer include, but are not limited to, acrylate homopolymers and copolymers, methacrylate homopolymers and copolymers, (meth)acrylate block copolymers, and (meth)acrylate copolymers containing other comonomer types, such as styrene.

The polymeric binder composition generally has a concentration of about 15–50% by weight, based on the total weight of the donor layer, preferably 30–40% by weight.

The donor layer typically comprises a colorant. The colorant can be a pigment or a dye, preferably a non-sublimable dye. It is preferred to use a pigment as the colorant for stability and for color density, and also for the high decomposition temperature. Examples of suitable inorganic pigments include carbon black and graphite. Examples of suitable organic pigments include Rubine F6B (C.I. No. Pigment 184); Cromophthal® Yellow 3G (C.I. No. Pigment Yellow 93); Hostaperm® Yellow 3G (C.I. No. Pigment Yellow 154); Monastral® Violet R (C.I. No. Pigment Violet 19); 2,9-dimethylquinacridone (C.I. No. Pigment Red 122); Indofast® Brilliant Scarlet R6300 (C.I. No. Pigment Red 123); Quindo Magenta RV 6803; Monastral® Blue G (C.I. No. Pigment Blue 15); Monastral Blue BT 383D (C.I. No. Pigment Blue 15); Monastral® Blue G BT 284D (C.I. No. Pigment Blue 15); and Monastral® Green GT 751D (C.I. No. Pigment Green 7). Combinations of pigments and/or dyes can also be used. For color filter array applications, high transparency pigments (that is at least about 80% of light transmits through the pigment) are preferred, having small particle size (that is about 100 nanometers).

In accordance with principles well known to those skilled in the art, the concentration of colorant will be chosen to achieve the optical density desired in the final image. The amount of colorant will depend on the thickness of the active coating and the absorption of the colorant. Optical densities greater than 1.3 at the wavelength of maximum absorption are typically required. Even higher densities are preferred. Optical densities in the 2–3 range or higher are achievable with application of this invention.

A dispersant is usually present when a pigment or other particulate material is to be transferred. The dispersant is generally an organic polymeric compound and is used to separate the fine pigment particles and avoid flocculation and agglomeration. A wide range of dispersants is commercially available. A dispersant will be selected according to the characteristics of the pigment surface and other components in the composition as practiced by those skilled in the art. However, one class of dispersant suitable for practicing the invention is that of the "AB" dispersants. The "A" segment of the dispersant adsorbs onto the surface of the pigment. The "B" segment extends into the solvent into which the pigment is dispersed. The B segment provides a barrier between pigment particles to counteract the attractive forces of the particles, and thus to prevent agglomeration. The B segment should have good compatibility with the solvent used. The AB dispersants of choice are generally described in U.S. Pat. No. 5,085,698. Conventional pigment dispersing techniques, such as ball milling, sand milling, etc., can be employed. The use of a dispersant for pigments can help maximize color strength, transparency and gloss.

The colorant can be present in the donor layer composition in an amount of from about 5% to about 95% by weight, preferably 35–65% by weight, based on the total weight of the donor layer composition. Although the above discussion was directed to color proofing, the element and process of the invention apply equally to the transfer of other types of materials in different applications. In general, the scope of the invention is intended to include any application in which material is to be applied to a receptor in a pattern.

The donor layer may be coated on the base element using a solution in a suitable solvent; however, it is preferred to coat the layer(s) using a dispersion. Any suitable solvent can be used as a coating solvent, as long as it does not deleteriously affect the properties of the assemblage, using conventional coating techniques or printing techniques, for example, gravure printing. A preferred solvent is water. The coating of the donor layer may also be accomplished using the WATERPROOF® Color Versatility Coater sold by DuPont, Wilmington, Del. Coating of the donor layer can thus be achieved shortly before the exposure step. This also allows for the mixing of various basic colors together to fabricate a wide variety of colors to match the PANTONE® color guide currently used as one of the standards in the proofing industry.

A thermal amplification additive is optionally, and preferably, present in the ejection layer(s), subbing layer or the donor layer. It can also be present in both of these layers.

The function of the thermal amplification additive is to amplify the effect of the heat generated in the heating layer and thus to further increase sensitivity. The additive should be stable at room temperature. The additive can be (1) a compound which, when heated, decomposes to form gaseous byproduct(s), (2) a dye which absorbs the incident laser radiation, or (3) a compound which undergoes a thermally induced unimolecular rearrangement which is exothermic. Combinations of these types of additives may also be used.

Thermal amplification additives that decompose upon heating include those that decompose to form nitrogen, such as diazo alkyls, diazonium salts, and azido (—N3) compounds; ammonium salts; oxides that decompose to form oxygen; carbonates; peroxides. Mixtures of additives can also be used. Preferred thermal amplification additives of this type are diazo compounds such as 4-diazo-N,N' diethylaniline fluoroborate (DAFB).

When the absorbing dye is incorporated in the ejection or subbing layer, its function is to absorb the incident radiation and convert this into heat, leading to more efficient heating. It is preferred that the dye absorbs in the infrared region. For imaging applications, it is also preferred that the dye has very low absorption in the visible region. Examples of suitable NIR (near infrared absorbing) dyes which can be used alone or in combination include poly(substituted) phthalocyanine compounds and metal-containing phthalocyanine compounds; cyanine dyes; squarylium dyes; chalcogenopyryioacrylidene dyes; croconium dyes; metal thiolate dyes; bis(chalcogenopyrylo) polymethine dyes; oxyindolizine dyes; bis(aminoaryl) polymethine dyes; merocyanine dyes; and quinoid dyes.

Infrared absorbing materials disclosed in U.S. Pat. Nos. 4,778,128; 4,942,141; 4,948,778; 4,950,639; 5,019,549; 4,948,776; 4,948,777 and 4,952,552 may also be suitable herein. The weight percentage of the thermal amplification additive, versus, for example, the total solid weight composition of the ejection or subbing layer may range from 0–20%. When present in the donor layer, the thermal amplification weight percentage is generally at a level of 0.95–11.5%. The percentage can range up to 25% of the total weight percentage in the colored a layer. These percentages are non-limiting and one of ordinary skill in the art can vary them depending upon the particular composition of the ejection layer or donor layer.

The donor layer generally has a thickness in the range of about 0.1 to 5 micrometers, preferably in the range of about 0.1 to 1.5 micrometers. Thickness greater than about 5 micrometers is generally not preferred as it requires excessive energy in order to be effectively transferred to the receiver.

Although it is preferred to have a single donor layer, it is also possible to have more than one donor layer, and the different donor layers can have the same or different compositions, as long as they all function as described above. The total thickness of the combined donor layers should be in the range given above.

Other materials can be present as additives in the donor layer as long as they do not interfere with the essential function of the layer. Examples of such additives include coating aids, plasticizers, flow additives, slip agents, antihalation agents, antistatic agents, surfactants, and others which are known to be used in the formulation of coatings. However, it is preferred to minimize the amount of additional materials in this layer, as they may deleteriously affect the final product after transfer. Additives may add unwanted color for color proofing applications, or they may decrease durability and print life in lithographic printing applications.

The donor element may have additional layers (not shown) as well. For example, an antihalation layer may be used on the side of the ejection layer opposite the donor layer. Materials that can be used as antihalation agents are well known in the art. Other anchoring or subbing layers can be present on either side of the ejection layer and are also well known in the art.

In some embodiments of this invention, a heat absorbing colorant, such as carbon black, is present in a single layer, termed the top layer. This type of colorant functions as both a heat absorber and a colorant, and thus the top layer has a dual function of being both a heating layer and a donor layer. The characteristics of the top layer are the same as those given for the donor layer. A preferred colorant/heat absorber can be a pigment and preferably is carbon black.

Other donor elements may comprise an alternate donor layer or layers on the donor element support. Additional layers may be present depending on the specific process used for imagewise exposure and transfer of the formed images. Some suitable donor or donor elements are disclosed in U.S. Pat. No. 5,773,188, U.S. Pat. No. 5,622,795, U.S. Pat. No. 5,593,808, U.S. Pat. No. 5,334,573, U.S. Pat. No. 5,156,938, U.S. Pat. No. 5,256,506, U.S. Pat. No. 5,427,847, U.S. Pat. No. 5,171,650 and U.S. Pat. No. 5,681,681.

Figure 2:
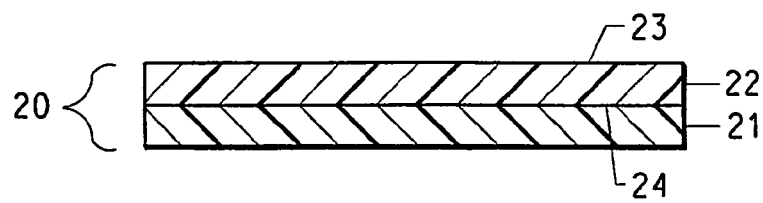
FIG. 2 illustrates a receiver element (20) useful in the invention having a receiver support (21) and an image receiving layer (22) with an image receiving surface (23) and a non-image-receiving interface (24).

The receiver element (20), shown in FIG. 2, is the second part of the laserable assemblage, to which the material from exposed areas of the donor is transferred. A specific material that can be transferred is a colorant, comprising a binder composition and a pigment. The receiver element of this invention comprises the formulation as previously described to form the image receiving layer (22).

In most cases, the exposed areas of the donor layer will not be removed from the donor element in the absence of a receiver element. That is, exposure of the donor element alone to laser radiation does not cause material to be removed, or transferred. The exposed areas of the donor layer are removed from the donor element upon exposure to laser radiation and transferred to the adjacent receiver element. In the preferred embodiment, the donor element actually contacts the receiver element.

The receiver element (20) may be non-photosensitive or photosensitive. The non-photosensitive receiver element preferably comprises a receiver support (21) and the image receiving layer (22) with an image receiving surface (23) and a non-image-receiving interface (24). The receiver support (21) typically comprises a dimensionally stable sheet material. The assemblage can be imaged through the receiver support if that support is transparent. Examples of transparent films for receiver supports include, for example polyethylene terephthalate, polyether sulfone, a polyimide, a poly(vinyl alcohol-co-acetal), polyethylene, or a cellulose ester, such as cellulose acetate. Examples of opaque support materials include, for example, polyethylene terephthalate filled with a white pigment such as titanium dioxide, ivory paper, or synthetic paper, such as Tyvek® spunbonded polyolefin. Paper supports are typical and are preferred for proofing applications, while a polyester support, such as poly(ethylene terephthalate) is typical and is preferred for a medical hardcopy and color filter array applications. Roughened supports may also be used in the receiver element.

In addition to the formulation of the image receiving layer (22) as described above, the image receiving layer may comprise one or more polymeric components such as polycarbonate; polyurethane; polyester; polyvinyl chloride; styrene/acrylonitrile; vinylacetate copolymers with ethylene and/or vinyl chloride; or (meth)acrylate (such as butylmethacrylate) polymers and copolymers thereof.

Other useful receiver element components are also disclosed in U.S. Pat. No. 5,534,387.

This coating weight of the image-receiving layer can be any amount effective for receiving the image. In general, good results have been obtained at coating weights ranging from 10 to 150 mg/dm$^2$, preferably 40 to 60 mg/dm$^2$. The image receiving layer may be roughened, typically by embossing with a textured film such as polyethylene which is applied to create the texture and then removed. A roughened texture may also be created by including roughening agents in the formulation.

In addition to the image-receiving layer, the receiver element may optionally include one or more other layers (not shown) between the receiver support and the image receiving layer. An additional layer between the image-receiving layer and the support is a release layer. The release layer can provide the desired adhesion balance to the receiver support so that the image-receiving layer adheres to the receiver support during exposure and separation from the donor element, but promotes the separation of the image receiving layer from the receiver support upon transfer, for example by lamination, of the image receiving layer to a permanent substrate or support. Examples of materials suitable for use as the release layer include polyamides, silicones, vinyl chloride polymers and copolymers, vinyl acetate polymers and copolymers and plasticized polyvinyl alcohols. The release layer can have a thickness in the range of 1 to 50 microns. A cushion layer which is a deformable layer may also be present in the receiver element, typically between the release layer and the receiver support. The cushion layer may be present to increase the contact between the receiver element and the donor element when assembled. Examples of suitable materials for use as the cushion layer include copolymers of styrene and olefin monomers such as styrene/ethylene/butylene/styrene, styrene/butylene/styrene block copolymers. Elastomers useful as binders in flexographic plate applications may also be useful for this purpose.

Figure 3:
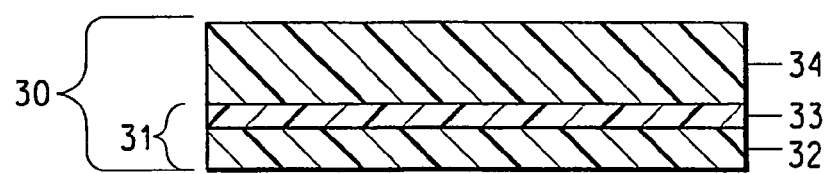
FIG. 3 illustrates an image rigidification element (30) useful in the invention having a rigidification support having a release surface (31) and a thermoplastic polymer layer (34).

An image rigidification element (30), shown in FIG. 3, may also be employed. The image rigidification element comprises a support having a release surface (31), and a thermoplastic polymer layer (34).

The support having a release surface (31) may comprise a support (32) and an optional layer (33) which may be a release layer. If the material used as the support (32), inherently has a releasable surface, e.g., polyethylene or a fluoropolymer, no additional surface layer is needed. The surface or release layer (33) should have sufficient adhesion to the support (32) to remain affixed to the support throughout the processing steps of the invention. Almost any material that has reasonable stiffness and dimensional stability is useful as the support (32). Some examples of useful supports (32) include polymeric films such as polyesters, including polyethylene terephthalate and polyethylene naphthanate; polyamides; polycarbonates; fluoropolymers; polyacetals; polyolefins, etc. The support (32) may also be a thin metal sheet or a natural or synthetic paper substrate. The support (32) may be transparent, translucent or opaque, it may be colored and may have incorporated therein additives such as fillers to aid in the movement of the image rigidification element through the lamination device during its lamination to the color image containing receiver element.

The support (32) may have antistatic layers coated on one or both sides. This may be useful in reducing static when the support (32) is removed from the thermoplastic polymer layer (34). It is generally preferred to have antistatic layers coated on the back side of the support (32), i.e., the side of the support away from the thermoplastic polymer layer (34). Materials which can be used as antistatic materials are well known in the art. Optionally, the support (32) may also have a matte texture to aid in transport and handling of the image rigidification element.

The release surface of the support (32) may be provided by a surface layer (33). Release layers are generally very thin layers which promote the separation of layers. Materials useful as release layers are well known in the art and include, for example, silicones; melamine acrylic resins; vinyl chloride polymers and copolymers; vinyl acetate polymers and copolymers; plasticized polyvinyl alcohols; ethylene and propylene polymers and copolymers; etc. When a separate release layer is coated onto the support, the layer generally has a thickness in the range of 0.5 to 10 micrometers.

The release layer (33) may also include materials such as antistats, colorants, antihalation dyes, optical brighteners, surfactants, plasticizers, coating aids, matting agents, and the like.

Thermoplastic polymers of the thermoplastic polymer layer (34) are preferably amorphous, i.e., non-crystalline, in character, have high softening points, moderate to high molecular weight and compatibility with the components of the image receiving polymer layer, e.g., polycaprolactone. Additionally, flexibility without cracking and possessing the capability to be attached to many different permanent substrates is advantageous. The polymer is preferably solvent soluble, has good solvent and light stability and is a good film former.

There are many useful thermoplastic polymer materials. Preferred for use in this invention are thermoplastic polymers having Tgs (glass transition temperatures) in the range of about 27 to 150° C., preferably 40 to 70° C., and more preferably 45 to 55° C., a relatively high softening points, e.g., Tg of 47° C., melt flow of 142° C.), low elongations at break as determined by ASTM D822A of e.g., 3, and moderate weight average molecular weight (Mw), e.g., in the area of 67,000. Polyester polymers, e.g., having a Tg of about 47° C., are preferred because good compatibility is achieved between the image receiving polymer, e.g., crystalline polycaprolactone and the polyester polymer in the image rigidification layer. However, other suitable polymers have been shown to give acceptable results. Some suitable polymers include methacrylate/acrylate, polyvinylacetate, polyvinylbutyral, polyvinylformal, styrene-isoprene-styrene and styrene-ethylene-butylene-styrene polymers, etc.

The thermoplastic polymer is present in the amount of about 60 to 90%, preferably about 70 to 85%, based on the total weight of the thermoplastic polymer layer components.

The thermoplastic polymer layer and image receiving layer relate to each other in that during the process the image becomes encased between them so that it does not move significantly during lamination to the permanent substrate, e.g., paper, and cooling. This significantly reduces halftone dot movement, swath boundary cracking and banding compared to similar processes not employing a thermoplastic polymer layer in this manner, i.e., an image rigidification element, and renders them barely perceptible or substantially eliminated.

The thermoplastic polymer layer also provides a vehicle or mechanism for the introduction of bleaching chemistry to reduce the impact on final color associated with the NIR dye in the transferred color image to the permanent substrate.

The thermoplastic polymer layer may also contain additives as long as they do not interfere with the functioning of this layer. For example, additives such as plasticizers, other modifying polymers, coating aids, surfactants can be used. Some useful plasticizers include polyethylene glycols, polypropylene glycols, phthalate esters, dibutyl phthalate and glycerine derivatives such triacetin. Preferably, the plasticizer is present in the amount of about 1 to 20%, most preferably 5 to 15%, based on the total weight of the thermoplastic polymer layer components.

As noted above, the thermoplastic polymer layer also preferably contains one or more dye bleaching agents for bleaching the thermal amplification additive, such as an NIR dye, which may be present in the donor element and/or the receiver element. Some useful bleaching agents include amines, azo compounds, carbonyl compounds and, organometallic compounds, and carbanions. Useful oxidants include peroxides, diacyl peroxides, peroxy acids, hydroperoxides, persulfates, N-halo amides, N-halo imides, and halogen compounds. Particularly preferred dye bleaching agents with polymethine type NIR dyes are those selected from the group consisting of hydrogen peroxide, organic peroxides, hexaaryl biimidazoles, N-halogenated succinimides, N-halogenated and bis-N-halogenated hydantoins, other halogenated organic compounds, persulfates, perborates, perphosphates, hypochlorites and azo compounds. In the halogenated bleaching agents the halogen can be any element of Group VII B of the Periodic Table of the Elements (Sargent-Welch Scientific Company 1979) but typically chlorine, bromine, or fluorine.

Dye bleaching agents are usually present in the amount of about 1 to about 20%, preferably about 5 to about 15%, based on the total weight of the thermoplastic polymer layer components.

The permanent substrate, for receiving the colored image can be chosen from almost any material desired. For most proofing applications a paper support is used, preferably the same paper on which the image will ultimately be printed. Other materials which can be used as the permanent substrate include cloth, wood, glass, china, most polymeric films, synthetic papers, thin metal sheets or foils, etc. Almost any material which will adhere to the thermoplastic polymer layer (34), can be used as the permanent substrate. In color filter applications the permanent substrate is typically glass.

Figure 4:
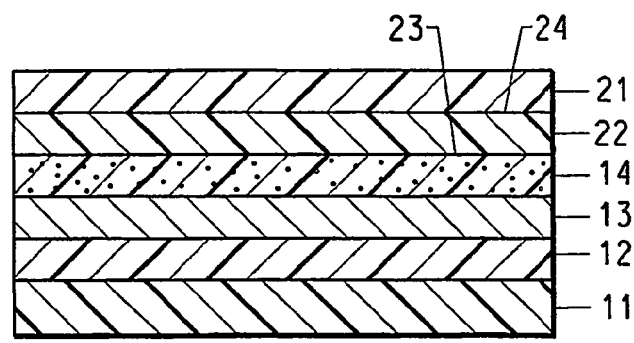
FIG. 4 illustrates the donor element (10) in contact with the receiver element (20) forming a sandwich with the donor layer (14) adjacent the image receiving layer (22) at the image receiving surface (23).

The first step in the process of the invention is imagewise exposing the laserable assemblage, e.g., as shown in FIG. 4, to laser radiation. The exposure step is preferably effected at a laser fluence of about 600 mJ/cm$^2$ or less, most preferably about 250 to 440 mJ/cm$^2$. The laserable assemblage comprises the donor element and the receiver element.

The assemblage is normally prepared following removal of coversheet(s), if present, by placing the donor element adjacent to the receiver element preferably such that the donor layer actually touches the image-receiving layer on the receiver element. This is represented in FIG. 4. Vacuum and/or pressure can be used to hold the two elements together. Alternately, the donor and receiver elements may be spaced slightly apart using spacer particles in the donor layer or the image receiving layer. As one alternative, the donor and receiver elements can be held together by fusion of layers at the periphery. As another alternative, the donor and receiver elements can be taped together and taped to the imaging apparatus, or a pin/clamping system can be used. As yet another alternative, the donor element can be laminated to the receiver element to afford a laserable assemblage. The laserable assemblage can be conveniently mounted on a drum to facilitate laser imaging.

Various types of lasers can be used to expose the laserable assemblage. The laser is preferably one emitting in the infrared, near-infrared or visible region. Particularly advantageous are diode lasers emitting in the region of 750 to 870 nm which offer a substantial advantage in terms of their small size, low cost, stability, reliability, ruggedness and ease of modulation. Diode lasers emitting in the range of 780 to 850 nm are most preferred. Such lasers are available from, for example, Spectra Diode Laboratories (San Jose, Calif.).

The exposure can take place through the flexible ejection layer of the donor element or through the receiver element, provided that these are substantially transparent to the laser radiation. In most cases, the donor flexible ejection layer will be a film which is transparent to infrared radiation and the exposure is conveniently carried out through the flexible ejection or subbing layer. However, if the receiver element is substantially transparent to infrared radiation, the process of the invention can also be carried out by imagewise exposing the receiver element to infrared laser radiation.

The laserable assemblage is exposed imagewise so that the exposed areas of the donor layer are transferred to the receiver element in a pattern. The pattern itself can be, for example, in the form of dots or line work generated by a computer, in a form obtained by scanning artwork to be copied, in the form of a digitized image taken from original artwork, or a combination of any of these forms which can be electronically combined on a computer prior to laser exposure. The laser beam and the laserable assemblage are in constant motion with respect to each other, such that each minute area of the assemblage, i.e., "pixel" is individually addressed by the laser. This is generally accomplished by mounting the laserable assemblage on a rotatable drum. A flat bed recorder can also be used.

The next step in the process of the invention is separating the donor element from the receiver element. Usually this is done by simply peeling the two elements apart. This generally requires very little peel force, and is accomplished by simply separating the donor element support from the receiver element. This can be done using any conventional separation technique and can be manual or automatic without operator intervention.

Figure 5:
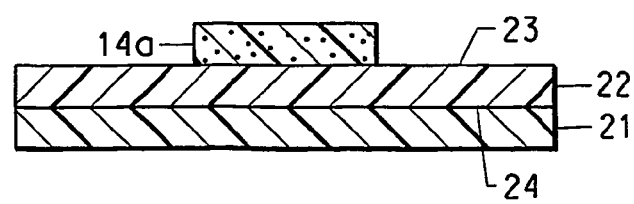
FIG. 5 illustrates the receiver element (20) having an image (14a) present on the image receiving surface (23) of the image receiving layer (22) resulting from exposure of the sandwich in FIG. 4, followed by separation of the donor element and the receiver element.

As shown in FIG. 5, separation results in a laser generated color image, also known as the colored image, preferably a halftone dot image, comprising the transferred exposed areas of the donor layer, being revealed on the image receiving layer of the receiver element. Preferably the image formed by the exposure and separation steps is a laser generated halftone dot color image formed on a layer on a receiver support.

Figure 6:
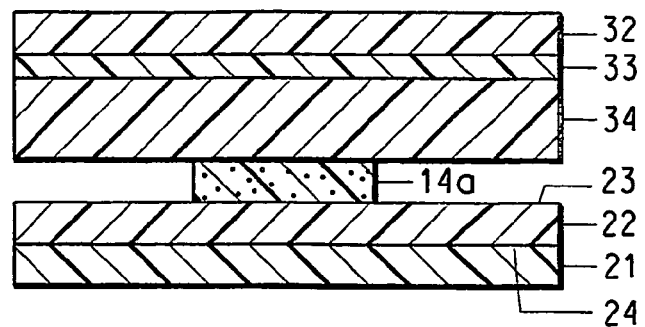
FIG. 6 illustrates the image rigidification element (30) adjacent to the image receiving surface (23) of the image receiving layer (22) having thereon the colored image (14a), with the colored image (14a) encased between the thermoplastic polymer layer (34) and the image receiving layer (22).

If an image rigidification element is used, the image rigidification element is then brought into contact with, preferably laminated to, the image receiver element with the image encased between the thermoplastic polymer layer of the image rigidification element and the image receiving layer of the receiver element. Typically the thermoplastic polymer layer is in contact with the image. This is best seen in FIG. 6. A WATERPROOF® Laminator, manufactured by DuPont, is preferably used to accomplish the lamination. However, other conventional means may be used to accomplish combining the image carrying receiver element with the thermoplastic polymer layer of the rigidification element. It is important that the adhesion of the rigidification element support having a release surface (31) to the thermoplastic polymer layer (34) be less than the adhesion between any other layers in the sandwich.

Figure 6A:
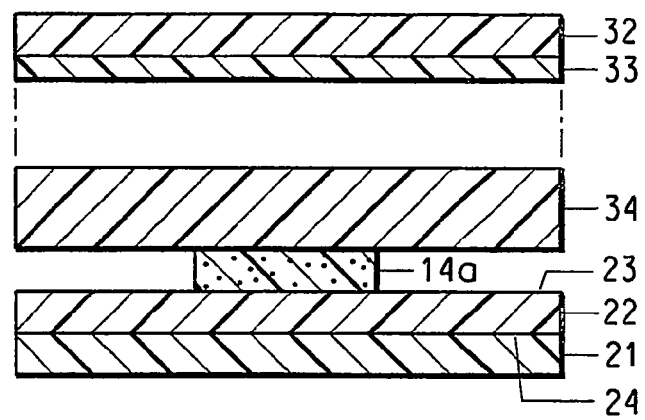
FIG. 6A illustrates the sandwich in FIG. 6 following removal of the rigidification support having a release surface (31).

The support (32) having a release surface (33) is then removed, preferably by peeling off, to reveal the thermoplastic film as seen in FIG. 6A. The color image on the receiver element can then be transferred to the permanent substrate by contacting the permanent substrate with, preferably laminating it to, the revealed thermoplastic polymer layer of the image rigidification layer (if used), or to the image receiving layer of the image receiving element, of the sandwich shown in FIG. 6A for the case using an image rigidification layer. Again a WATERPROOF® Laminator, manufactured by DuPont, is preferably used to accomplish the lamination. However, other conventional means may be used to accomplish this contact which results in the sandwich shown in FIG. 7.

Figure 7:
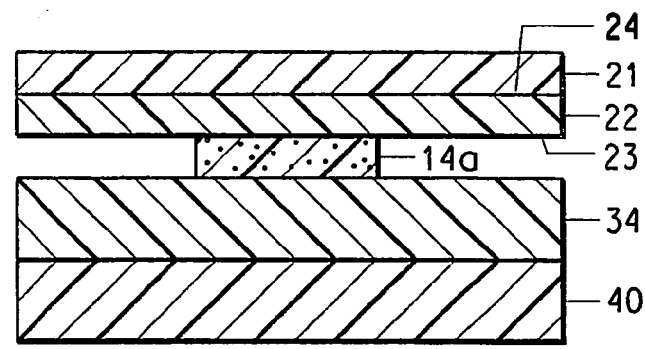
FIG. 7 illustrates the sandwich resulting from the lamination of the sandwich shown in FIG. 6A to the permanent substrate (40), e.g., paper, with the thermoplastic polymer layer (34) adjacent the paper.
Figure 8:
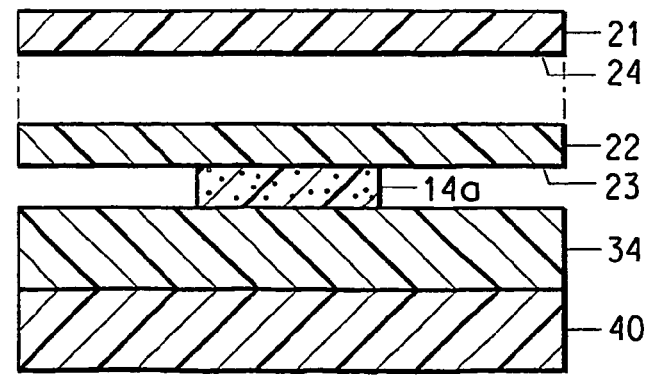
FIG. 8 illustrates the final element, e.g., a printed proof, formed when the receiver support (21) is separated from the image receiving layer (22), which exposes the non-image-receiving interface (24) to the environment.

Another embodiment includes the additional step of removing, preferably by peeling off, the receiver support (21) resulting in the assemblage or sandwich shown in FIG. 8. In a preferred embodiment, the assemblages illustrated in FIGS. 7 and 8 represent a printing proof comprising a laser generated halftone dot color thermal image formed on a crystalline polymer layer, and a thermoplastic polymer layer laminated on one surface to said crystalline polymer layer and laminated on the other surface to the permanent substrate, whereby the color image is encased between the crystalline polymer layer and the thermoplastic polymer layer.

The removal of the receiver support (21) reveals the non-image-receiving interface (24) of the image receiving layer (22) to the environment as a new surface. One advantage of the formulation of this invention is that in processing or for a final object, when the receiving layer is exposed to the environment as a new surface, it is durable, blocking resistant, and transparent.

In proofing applications, the receiver element can be an intermediate element onto which a multicolor image is built up. A donor element having a donor layer comprising a first colorant is exposed and separated as described above. The receiver element has a colored image formed with the first colorant, which is preferably a laser generated halftone dot color thermal image. Thereafter, a second donor element having a donor layer different than that of the first donor element forms a laserable assemblage with the receiver element having the colored image of the first colorant and is imagewise exposed and separated as described above. The steps of (a) forming the laserable assemblage with a donor element having a different colorant than that used before and the previously imaged receiver element, (b) exposing, and (c) separating are sequentially repeated as often as necessary in order to build the multicolored image of a color proof on the receiver element.

The rigidification element if used is then brought into contact with, preferably laminated to, the multiple colored images on the image receiving element with the last colored image in contact with the thermoplastic polymer layer.

When the process of this invention is employed in making a color filter, the pigment is usually transparent and the image is associated with an electrically conducting layer in processes well known in the color filter art including those disclosed in U.S. Pat. No. 5,521,035 and in U.S. Pat. No. 5,166,026.

Typically, the image receiving layer of the invention and process of using the image receiving layer of the invention apply equally to the transfer of other types of materials in different applications, for example, using an image transfer element to make color filters, typically used in making liquid crystal display devices and flat panel displays. In general, the scope of the invention is intended to include any application in which solid material is to be applied to a receptor in a pattern.

One application of the invention is in making a radiation filter, such as a monochrome filter or a color filter. Radiation filters can be used in displays such as flat panel displays, liquid crystal displays, displays illuminated by organic light-emitting diodes, and displays illuminated by plasma processes. Displays may display one (monochrome) or more colors (e.g. red, green, and blue) including white, black, and greys.

The objects patterned with a pigmented layer of the present invention can be used in liquid crystal display devices such as a flat panel display. Liquid crystal display devices generally include two spaced, partially or fully transparent panels which define a cavity that is filled with a liquid crystal material. One partially transparent panel may comprise a monochrome or color radiation filter of the present invention, or a radiation filter can be associated and aligned with the two panels. For actively-driven liquid crystal display devices, a transparent electrode is formed on one of the transparent panels, which electrode may be patterned or not, while individually addressable transparent electrodes are formed on the other of the transparent panels. Alignment layers are provided over the transparent electrode layers on both panels and are treated to orient the liquid crystal molecules in order to introduce a twist, e.g., of 90 degrees, between the panels. Thus, in one type of display the plane of polarization of plane polarized light will be rotated in a 90 degree angle as it passes through the twisted liquid crystal composition from one surface of the cell to the other surface. Orientations such as twisted nematic and super-twisted nematic can be used. Application of an electric field between the selected electrodes of the cell causes the oriented twist of the liquid crystal composition to be temporarily disrupted in the portion of the cell between the selected electrodes, thereby changing the polarization change of light transmitted through the liquid crystal composition. By use of optical polarizers on each side of the cell, polarized light can be fully or partially passed through the cell or extinguished, depending on whether or not an electric field is applied.

Each of the individual electrodes has a surface area corresponding or correlating to the area of one monochrome or color element known as a pixel. If the device is to have color capability, each pixel must be aligned with a color area, e.g., red, green or blue, of a color filter. Depending upon the image to be displayed, one or more of the pixel electrodes is energized during display operation to allow full light, no light or partial light to be transmitted through the color filter area associated with that pixel. The image perceived by a user is a blending of colors formed by the transmission of light through adjacent and nearby color filter areas.

The polymeric alignment layer described above can be any of the materials commonly used in the liquid crystal art. Examples of such materials include polyimides, polyvinyl alcohol and methyl cellulose. The transparent conducting electrode described above is also conventional in the liquid crystal art. Examples of such materials include indium tin oxide, indium oxide, tin oxide and cadmium stannate.

EXAMPLES

All percentages in compositions are on a weight basis unless otherwise stated. Cited materials can be obtained from the following sources:

TONE® P-787 polycaprolactone (CAS [24980-41-4])
    Union Carbide Company, Danbury, Conn. or Dow Chemical Company, Midland, Mich.
CAPA® 650 polycaprolactone (CAS [24980-41-4])
    Solvay, Warrington, England.
CAB (CAS [9004-36-8]) line of cellulose acetate butyrate polymers
    Eastman Chemical Company, Kingsport, Tenn.
CAP (CAS [9004-39-1]) line of cellulose acetate propionate polymers
    Eastman Chemical Company, Kingsport, Tenn.
BROOKFIELD® viscometer
    Brookfield Engineering Laboratories, Inc., Middleboro, Mass.
ELVAX® 3124 extrudable ethylene-vinyl acetate copolymer resin
    DuPont, Wilmington, Del.
CRONAR® 471X biaxially oriented, heat-set, polyethylene terephthalate film
    DuPont, Wilmington, Del.
Tredegar TSM (Two Sided Matte) Polyethylene
    Tredegar, Terra Haute, Ind.
Lustro Gloss #100 paper, LOE paper
    Warner Paper, Westbrook, Me.
Tetrahydrofuran (THF) (CAS 109-99-9)
    Sigma-Aldrich Chemical Company, St. Louis, Mo.
Acetone (CAS 67-64-1)
    Sigma-Aldrich Chemical Company, St. Louis, Mo.
KYNAR® 2801 Hexafluoropropylene-vinylidene polymer (CAS 9011-17-0),
    DuPont, Wilmington, Del.
MACROMELT®6900, polyamide polymer (CAS 70983-76-5)
    Henkel Group, Düsseldorf, Germany
TYRIL®100, Styrene Acrylonitrile Polymer (CAS 009003-54-7)
    Dow Chemical, Midland, Mich.
STYRON® 615 Styrene Polymer (CAS 009003-53-6)
    Dow Chemical, Midland, Mich.
Donor Elements: Black donor element H71081, Magenta donor element H71014, Cyan Donor element H70980, Yellow donor element H71030
    DuPont, DuPont Electronics and Communications Technologies, Wilmington, Del.
Image Rigidification Layer: IRL H74889
    DuPont, DuPont Electronics and Communications Technologies, Wilmington, Del.

The following examples demonstrate certain processes and products described herein. Throughout, all temperatures are in ° C. and all percentages are weight percentages unless otherwise specified.

Example 1

Polycaprolactone TONE® P-787 (8.4 grams) was combined with cellulose ester CAB 381-2 (3.6 grams) and tetrahydrofuran (88 grams) with stirring to produce a first blend of 70:30 TONE® P-787: CAB 381-2 of 12% solids content by weight in tetrahydrofuran. The completely dissolved blend had a viscosity of 344 centipoise as measured by a BROOKFIELD® viscometer (spindle #31, speed 30 RPM, room temperature). The blend was coated with a #22 wire wound rod to a coating weight of 45 mg/dm$^2$ atop a receiver layer support consisting of a 1.25 mil layer of melt-extruded ELVAX® 3124 release layer on CRONAR® 471X underlying base support. The coated blend was dried with a stream of heated air produced by a heat gun to give an image receiving element comprising an image receiving layer of the dried blend on the receiver layer support. The image receiving layer was embossed with Tredegar TSM polyethylene under heat of about 82° C. (180° F.) and pressure of about 800+/−400 psi to texture the surface.

Black, cyan, magenta and yellow donor elements (Black donor element H71081, Magenta donor element H71014, Cyan Donor element H70980, Yellow donor element H71030) and the so prepared image receiver element were placed in the cassette of a Creo Spectrum Trendsetter, Creo, Vancouver, BC, and sequentially imaged under varying conditions to determine optimal settings. Drum speed was varied from about 140 to 230 RPM, wattage from 9 to 16 watts, and SD was varied from 60–75. The computer attached to the Trendsetter contained digital data files representing the 4 process colors (yellow, magenta, cyan and black).

This imaging equipment produced a laser generated four color thermal digital halftone image (proof) in reverse reading form on the final, separated, image receiver element, using the digital image data file representing each respective color. This four color imaged receiver element resulted from the incorporation and removal of the original image receiver element into four separate laserable assemblages. Exposure was effected at a laser fluence of about 250 mJ/cm2.

An IRL H74889 image rigidification element was positioned over the color image on a WATERPROOF® Carrier Plate (DuPont) with the thermoplastic polymer layer of the image rigidification element in direct contact with the image. Care was taken to ensure that all air was removed prior to lamination between the layers by smoothing the image rigidification element with a WATERPROOF® Antistatic Brush (DuPont). This 'sandwich' structure was laminated together with a WATERPROOF® Laminator (DuPont) at the following setting (120° C. top roll, 115° C. bottom roll; 150#; 800 mm/min). The image rigidification element support was then removed from the sandwich leaving behind the four-color digital image encased between the thermoplastic polymer layer of the image rigidification element and the image receiving layer on the image receiver element.

The above sandwich structure was placed on top of a permanent substrate (Lustro Gloss #100 paper) with the thermoplastic polymer layer down and laminated with the standard WATERPROOF® laminator using the paper setting (120° C. top roll, 115° C. bottom roll; 450#; 600 mm/min). After allowing the sandwich to cool (about 5 minutes), the receiver support was removed and the image allowed to set at room temperature for an additional 5–10 minutes to give a highly durable four color halftone dot thermal image on paper.

Examples 2–8

The cellulose esters shown in Table 2 were used as in Example 1 to replace CAB 381-2 to form other preferred embodiments of the image receiving element. Blends 2–8 were used to form correspondingly Examples 2–8. Three grams of cellulose ester was blended with seven grams of TONE® P-787 and 90 grams of tetrahydrofuran to form a 70:30 TONE® P-787: cellulose ester blend of 10% solids content by weight in tetrahydrofuran.

TABLE 2

| Blend/Example | Cellulose Ester |
|---|---|
| 2 | CAB 381-20 |
| 3 | CAB 551-0.2 |
| 4 | CAP 500-5 |
| 5 | CAP 482-0.5 |
| 6 | CAB 553-0.4 |
| 7 | CAB 531-1 |
| 8 | CAB 321-0.1 |

Example 9

Polycaprolactone TONE® P-787 (6.0 grams) was combined with cellulose ester CAB 381-2 (6.0 grams) and tetrahydrofuran (88 grams) with stirring to produce a first blend of 50:50 TONE® P-787: CAB 381-2 blend of 12% solids content by weight in tetrahydrofuran. The completely dissolved blend had a viscosity of 239 centipoise as measured by a BROOKFIELD® viscometer (spindle #31, speed 30 RPM, room temperature). The procedures of Example 1 were repeated to give a durable four color halftone dot thermal image on paper of acceptable imaging quality.

Comparative Examples

The polymers shown in Table 3 were used in blends with TONE® P-787 (unless noted as 100% polymer, e.g. Comparative Example 6-C, 7-C) with solvents (as indicated) to produce image receiving elements and final products by the procedures of Example 1. For example, in Comparative Example 1-C, 3 parts of polystyrene were combined with 7 parts of TONE® P-787 and 90 parts tetrahydrofuran to give a 10% solids blend which was used to make an image receiving element by the procedure of Example 1.

TABLE 3

| Comparative Blend/ Comparative Example | Polymer (solvent) | Polymer: TONE ® P-787 (solids of solution) |
|---|---|---|
| 1-C | KYNAR ® 2801 (THF) | 30:70 (10%) |
| 2-C | Macromelt 6900 (THF) | 30:70 (10%) |
| 3-C | TYRIL ® 100 (THF) | 30:70 (10%) |
| 4-C | STYRON ® 615 (THF) | 30:70 (10%) |
| 5-C | CAPA ® 650 (THF) | 100:0 (11%) |
| 6-C | MOWILITH ® 60 (acetone) | 100:0 (10%) |

For Comparative Examples 1-C through 4-C scratch and mar resistance were easily observed to be unacceptably poor.

Results

The final products (four color halftone dot thermal images on paper) produced for the Examples and Comparative Examples were evaluated for performance. In one method of rating the performance, a rating of "++" denotes excellent qualities, "+" denotes very good, "0" denotes acceptable performance, "−" denotes needing some improvement, and "−−" denotes very poor performance.

In one assessment, the final products were subjected to a blocking test. Blocking is the tendency of the outer surfaces of the object to stick to other surfaces, particularly to itself. The test consisted of stacks made face to face (F to F, where each face is the the non-image-receiving interface (24) of the image receiving layer (22)), face to LOE paper (F to LOE), and with or without a 1 lb weight per square inch. The samples were held in contact at 40 degrees Centigrade, 50% relative humidity (RH) for a period of 24 hours. The stacks were then assessed for blocking by separating the stacks by peeling them apart and observing the force needed for separation and the quality (smoothness, transparency) of the faces after separation. The property of blocking can also be tested by methods such as those detailed in ASTM D1146-88 "Standard Method for Blocking Point of Potentially Adhesive Layers", ASTM D-918-99 "Standard Test Method for Blocking Resistance of Paper and Paperboard", ASTM D4946-89(1999) "Standard Test Method for Blocking Resistance of Architectural Paints", or ASTM D3003-01 "Standard Test Method for Pressure Mottling and Blocking Resistance of Organic Coatings on Metal Substrates".

In another test, pencil leads of increasing hardness values were forced against the film coating surface in a precisely defined manner as described in ASTM D-3363-74 until one pencil lead cut through the surface of the film coating. The surface hardness was considered as the hardest pencil grade which just failed to cut or mar the film coating surface. The pencil leads in order of softest to hardest were reported as follows: 6B, 5B, 4B, 3B, 2B, B, HB, F, H, 2H, 3H, 4H, 5H, 6H, 7H, 8H and 9H.

TABLE 4

Blocking Results

| Example | Blocking Summary (3 configurations, and w/, w/o 1 lb/sq inch) |
|---|---|
| 1 | ++ |
| 9 | ++ |
| 5-C | O |
| 6-C | −− |

The blocking results indicate that Example 1 and Example 9 are improved over Comparative Example 5-C and are much improved over Comparative Example 6-C.

TABLE 5

Pencil Hardness

| Example | Pencil Hardness |
|---|---|
| 1 | H |
| 5-C | 4B |
| 6-C | 2B/B |

The pencil hardness results of Table 5 indicate that Example 1 is of improved scratch resistance and therefore more durable in comparison to Comparative Example 6-C and particularly in comparison to Comparative Example 5-C.

What is claimed is:

1. A method for forming an imaged element, comprising: forming an assemblage, comprising:

a donor element comprising a donor layer releaseably attached to a support, the donor layer comprising a transfer material, a receiver element comprising
   (a) a receiver support; and
   (b) an Image receiving layer applied to a surface of the receiver support for receiving the transfer material, the image receiving layer comprising a caprolactone polymer composition comprising about 70% to 100% by weight of caprolactone based on the entire weight of the caprolactone polymer composition and a cellulose ester composition comprising
      (i) about 20% to about 100% of a first ester group which is a propionyl group or a butyryl group or a combination of a propionyl and a butyryl group,
      (ii) up to about 25% of a second ester group which is an acetyl group, and
      (iii) up to about 10% of hydroxyl groups,
   based on the weight of the cellulose ester composition, the weight ratio of the caprolactone polymer composition to the cellulose ester composition being greater than about one to one and wherein the donor layer is adjacent to the image receiving layer, and imagewise exposing the assemblage to actinic radiation sufficient to transfer the transfer material to the image receMng layer to form an imaged receiver.

2. The method of claim 1 further comprising the steps of removing the releaseably attached support of the donor element to reveal an imaged surface of the receiver element and contacting the imaged surface with an image rigidification element.

3. The method of claim 1 wherein the rigidification element comprises a bleaching agent.

4. The method of claim 1 wherein the image receiving layer comprises polycaprolactone and cellulose acetate butyrate.

5. The method of claim 1 wherein the image receiving layer comprises polycaprolactone and cellulose acetate propionate.

6. The method of claim 1 wherein the cellulose ester composition has a melting point ranging from about 120 to about 220° C.

7. The method of claim 1 wherein the cellulose ester composition has a glass transition temperature ranging from about 90 to about 150° C.

8. The method of claim 1 wherein the molecular weight range of the cellulose ester composition ranges from about 5,000 to about 150,000 daltons.

9. The method of claim 1 wherein the ratio of the caprolactone polymer composition to the cellulose ester composition is equal to or greater than about 7:3.

10. The method of claim 1 wherein the transfer material comprises a colorant.

11. The method of claims 1 or 3 wherein the transfer material further comprises a near infrared dye.

12. The method of claim 1 wherein the transfer material comprises pigment particles.

13. A method of making a color filter comprising detaching the support of the donor element from the imagewise exposed assemblage of claim 1 to reveal an imaged surface of the imaged receiver and attaching the imaged receiver to a transparent substrate to form a color filter.

14. A method of making a liquid crystal display device, comprising associating the color filter made by the process of claim 13 with an electrically conductive coating, a liquid crystal material and an alignment layer.

15. The method of claim 1 in which the image receiving layer comprises about 90% to about 100% by weight of caprolactone based on the entire weight of the caprolactone polymer composition.

16. The method of claim 1 in which the image receiving layer comprises
  (a) about 25% to about 100% of a first ester group which is a propionyl group or a butyryl group or a combination of a propionyl and a butyryl group.
  (b) up to about 10% of a second ester group which is an acetyl group, and
  (c) up to about 3% of hydroxyl groups,
  based on the weight of the cellulose ester composition.

17. The method of claim 1 wherein the image receiving layer contacts the donor layer.

18. An imaged receiver formed by the method of claim 1.

19. The imaged receiver of claim 18 in which the image receiving layer comprises about 90% to about 100% by weight of caprolactone based on the entire weight of the caprolactone polymer composition.

20. The imaged receiver of claim 18 in which the image receiving layer comprises
  (a) about 25% to about 100% of a first ester group which is a propionyl group or a butyryl group or a combination of a propionyl and a butyryl group,
  (b) up to about 10% of a second ester group which is an acetyl group, and
  (c) up to about 3% of hydroxyl groups,
  based on the weight of the cellulose ester composition.

21. The imaged receiver of claim 18 wherein the image receiving layer comprises polycaprolactone and cellulose acetate butyrate.

22. The imaged receiver of claim 18 wherein the image receiving layer comprises polycaprolactone and cellulose acetate propionate.

23. The imaged receiver of claim 18 wherein the cellulose ester composition has a melting point ranging from about 120 to about 220° C.

24. The imaged receiver of claim 18 wherein the cellulose ester composition has a glass transition temperature ranging from about 90 to about 150° C.

25. The imaged receiver of claim 18 wherein the molecular weight range of the cellulose ester composition ranges from about 5,000 to about 150,000 daltons.

26. The imaged receiver of claim 18 wherein the ratio of the caprolactone polymer composition to the cellulose ester composition is equal to or greater than about 7:3.

27. An assemblage comprising:
  a donor element comprising a donor layer which comprises a transfer material; and
  a receiver element comprising
    (a) a receiver support; and
    (b) a receiving layer applied to a surface of the receiver support for receiving the transfer material, the receiving layer comprising a caprolactone polymer composition comprising about 70% to 100% by weight of caprolactone based on the entire weight of the caprolactone polymer composition and a cellulose ester composition comprising
      (i) about 20% to about 100% of a first ester group which is a propionyl group or a butyryl group or a combination of a propionyl and a butyryl group,
      (ii) up to about 25% of a second ester group which is an acetyl group, and
      (iii) up to about 10% of hydroxyl groups,
    based on the weight of the cellulose ester composition,
    the weight ratio of the caprolactone polymer composition to the cellulose ester composition being greater than about one to one, and
    the receiving layer being adjacent to the donor layer.

28. The assemblage of claim 27 in which the donor element comprises a support releaseably attached to the donor layer.

29. The assemblage of claim 27 wherein the receiving layer comprises polycaprolactone and cellulose acetate butyrate.

30. The assemblage of claim 27 wherein the receiving layer comprises polycaprolactone and cellulose acetate propionate.

31. The assemblage of claim 27 wherein the cellulose ester composition has a melting point ranging from about 120 to about 220° C.

32. The assemblage of claim 27 wherein the cellulose ester composition has a glass transition temperature ranging from about 90 to about 150° C.

33. The assemblage of claim 27 wherein the molecular weight range of the cellulose ester composition ranges from about 5,000 to about 150,000 daltons.

34. The assemblage of claim 27 wherein the ratio of the caprolactone polymer composition to the cellulose ester composition is equal to or greater than about 7:3.

35. The assemblage of claim 27 wherein the transfer material comprises a colorant.

36. The assemblage of claims 27 wherein the transfer material further comprises a near infrared dye.

37. The assemblage of claim 27 wherein the transfer material comprises pigment particles.

38. The assemblage of claim 27 in which the receiving layer comprises about 90% to about 100% by weight of caprolactone based on the entire weight of the caprolactone polymer composition.

39. The assemblage of claim 27 in which the receiving layer comprises
  (a) about 25% to about 100% of a first ester group which is a propionyl group or a butyryl group or a combination of a propionyl and a butyryl group,
  (b) up to about 10% of a second ester group which is an acetyl group, and
  (c) up to about 3% of hydroxyl groups,
  based on the weight of the cellulose ester composition.

40. The assemblage of claim 27 wherein the receiving layer contacts the donor layer.

* * * * *